E. Sharkley,
Hay Fork.
No. 57,199. Patented Aug. 14, 1866.
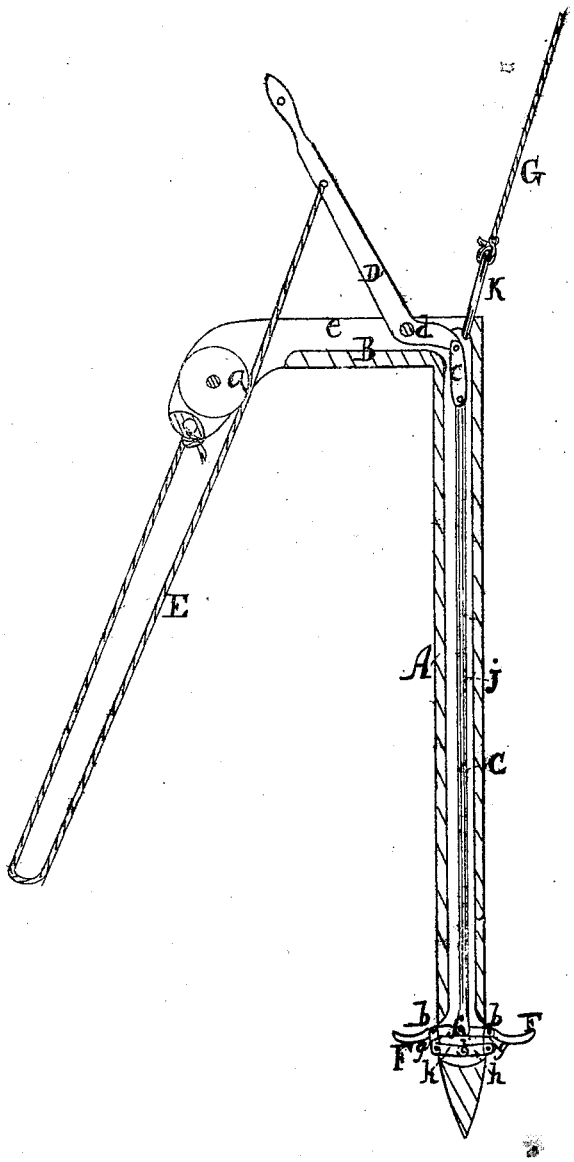

UNITED STATES PATENT OFFICE.

E. SHORKLEY, OF LEWISBURG, PENNSYLVANIA.

IMPROVEMENT IN HORSE HAY-FORKS.

Specification forming part of Letters Patent No. 57,199, dated August 14, 1866.

*To all whom it may concern:*

Be it known that I, E. SHORKLEY, of Lewisburg, in the county of Union and State of Pennsylvania, have invented a new and Improved Hay-Elevating Device; and I do hereby declare that the following is a full, clear, and exact description thereof, which will enable others skilled in the art to make and use the same, reference being had to the accompanying drawing, forming part of this specification.

The drawing represents a vertical central section of the sheath or case of my invention, the operating or internal parts not being in section.

This invention relates to a new and improved device for elevating hay in barns and depositing it in bays by the aid of a horse.

The invention consists in forming the case or sheath with an arm to admit of the device, in connection with the lever-rope, being so controlled that it cannot turn with its load while being elevated.

A represents a case or sheath, which may be made of wrought or cast iron, and has a lateral tubular arm or projection, B, at its upper end, in which a pulley, a, is fitted near the outer end, as shown clearly in the drawing.

The lower end of the case or sheath is pointed, and has openings b b in it at opposite sides, which communicate with the bore or interior of the main portion of the sheath.

Within the case or sheath there is fitted a rod, C, the upper end of which is connected, by a link, c, with the lower end of a lever, D, the fulcrum d of which is in the arm or projection B, the upper part and longer arm of said lever extending through a slot, e, in the upper edge of the arm B, and having a rope, E, attached to it.

To the lower end of the rod C there are attached, by a pivot, f, two hooks, F F, said hooks projecting from the rod C at opposite sides, and these hooks are connected by a link, g, with arms h h, the inner ends of which are secured by a pivot, i, in the case or sheath. These hooks, links, and arms have such a relative position with the openings b b, near the lower end of the case or sheath, that when the rod C is forced or pressed down the hooks F F will be forced outward through the openings b b, as shown in the drawing, and when the rod C is drawn upward said hooks will be drawn within the case or sheath. This movement of the rod is effected through the medium of the lever D.

The case or sheath is formed with a longitudinal slot, j, in which a ring, k, is fitted, having the hoisting-rope G attached to it.

The device is raised and lowered by the usual tackle, with a horse attached to it, in the ordinary way.

When the device is down on the load the hooks F F are within the sheath, and the operator thrusts the lower end of the sheath into the hay, and then forces out the hooks F F by actuating lever D. The horse is then started forward and the device elevated, the hooks F holding the load, and the operator having the rope E in his hand, which, in consequence of being at the inner side of pulley a in the outer part of arm B, prevents the device from turning while being elevated.

When the device is elevated over the spot where the hay is to be discharged the operator pulls the rope E, and thereby actuates the lever D, raises the rod C, and draws the hooks F within the case or sheath, causing the load to be discharged.

The arm B, it will be seen, performs two important functions—to wit, admits of a proper leverage for the lever D, and serves, in connection with rope E, to prevent the device from turning while being elevated.

Having thus described my invention, I claim as new and desire to secure by Letters Patent—

1. The case or sheath A, provided with an arm or projection, B, at its upper end, in connection with the hooks F F, connected with the rod C and case or sheath A, and operated through the medium of lever D or its equivalent, substantially as and for the purpose set forth.

2. The particular arrangement of the hooks F F, links g g, and arms h h, to operate in the manner substantially as and for the purpose specified.

The above specification of my invention signed by me this 23d day of April, 1866.

E. SHORKLEY.

Witnesses:
 CHAS. C. SHORKLEY,
 GEO. SHORKLEY.